US005746238A

United States Patent [19]

Brady et al.

[11] Patent Number: 5,746,238

[45] Date of Patent: May 5, 1998

[54] LIQUID CHEMICAL DILUTION AND DOSING SYSTEM

[75] Inventors: Daniel F. Brady, Eagan; John E. McCall, Jr., West St. Paul; Paul J. Mattia, Prior Lake; John M. Lavorata, Burnsville; Matthew D. PeKarna, Bloomington; Robert David Stokes, East Bethel; Clyde Arthur Bailey, Hastings, all of Minn.

[73] Assignee: Ecolab, Inc., St. Paul, Minn.

[21] Appl. No.: 414,635

[22] Filed: Mar. 31, 1995

[51] Int. Cl.$^6$ .......... G05D 7/06

[52] U.S. Cl. .......... 137/3; 137/101.19

[58] Field of Search .......... 137/3, 101.19

[56] References Cited

U.S. PATENT DOCUMENTS

| | | | |
|---|---|---|---|
| 2,314,152 | 3/1943 | Mallory | 137/153 |
| 2,641,271 | 6/1953 | Pressler | 137/87 |
| 2,823,833 | 2/1958 | Bauerlein | 222/129.2 |
| 3,160,317 | 12/1964 | Hambro | 222/1 |
| 3,219,046 | 11/1965 | Waugh | 137/8 |
| 3,229,077 | 1/1966 | Gross | 235/151.34 |
| 3,336,767 | 8/1967 | MacKenzie et al. | 68/12 |
| 3,438,385 | 4/1969 | Nogami . | |
| 3,726,296 | 4/1973 | Frieland et al. | 137/599 X |
| 3,762,428 | 10/1973 | Beck et al. | 137/88 |
| 3,797,744 | 3/1974 | Smith | 239/172 |
| 3,826,113 | 7/1974 | Boraas et al. | 68/12 R |
| 4,020,865 | 5/1977 | Moffat et al. | 137/268 |
| 4,090,475 | 5/1978 | Kwan | 222/70 |
| 4,103,520 | 8/1978 | Jarvis et al. | 68/12 R |
| 4,441,340 | 4/1984 | Kaplan | 68/12 R |
| 4,524,801 | 6/1985 | Magnasco et al. | 137/567 |
| 4,526,188 | 7/1985 | Olsson et al. | 137/3 |
| 4,648,043 | 3/1987 | O'Leary | 364/510 |
| 4,691,850 | 9/1987 | Kirschmann et al. | 222/642 |
| 4,845,965 | 7/1989 | Copeland et al. | 68/17 R |
| 4,858,449 | 8/1989 | Lehn | 68/12 R |
| 4,932,227 | 6/1990 | Hogrefe | 68/17 R |
| 4,941,596 | 7/1990 | Marty et al. | 222/144.5 |
| 4,964,185 | 10/1990 | Lehn | 8/158 |
| 4,976,137 | 12/1990 | Decker et al. | 73/53 |
| 5,014,211 | 5/1991 | Turner et al. | 364/478 |
| 5,195,203 | 3/1993 | Blom et al. | 8/158 |
| 5,203,366 | 4/1993 | Czeck et al. | 137/3 |
| 5,246,026 | 9/1993 | Proudman | 137/3 |
| 5,390,385 | 2/1995 | Beldham | 8/158 |
| 5,392,618 | 2/1995 | Livingston et al. | 68/12.02 |

FOREIGN PATENT DOCUMENTS

| | | |
|---|---|---|
| 0 403 296 B1 | 12/1990 | European Pat. Off. . |
| 1577908 | 10/1980 | United Kingdom . |

*Primary Examiner*—Gerald A. Michalsky
*Attorney, Agent, or Firm*—Merchant, Gould, Smith, Edell, Welter & Schmidt

[57] ABSTRACT

This invention relates to an apparatus and method for diluting a chemical concentrate. More particularly, dilution control is achieved by monitoring two flow meters, comparing the flow rate information, and adjusting the diluent flow to achieve a predetermined dilution of the chemical concentrate. An air push is preferably used to deliver the chemicals to the utilization points. Also a controller is used to prioritize requests from the utilization points in a hierarchal fashion.

33 Claims, 8 Drawing Sheets

LIQUID CHEMICAL DILUTION AND DOSING SYSTEM

FIELD OF THE INVENTION

This invention relates to a dispenser system that dilutes chemical concentrates with an aqueous diluent at controlled ratios and delivers the dilution to a utilization point. More particularly, the invention relates to the preparation and delivery of aqueous laundry chemicals in highly accurate dosages and dilution ratios to a laundry washing machine, preferably by utilizing an air push.

BACKGROUND OF THE INVENTION

Chemical cleaning compounds have long been advantageously used in a variety of contexts. Such compounds are produced in solid, granulated, powdered, and liquid form. Typically, these cleaning compounds are purchased by users as a concentrated bulk chemical. The concentrated chemical is then usually diluted prior to delivering the chemical to its utilization point. The dilution increases safety and provides the required activity level at the utilization point. Generally, the concentrated chemical is mixed with a solvent or diluent (e.g., water) to form the diluted cleaning solution.

In many cleaning processes (including commercial laundering, industrial warewashing and housekeeping), a series of solutions are dispensed to a utilization point in order of use. In the present case, the utilization point can be considered to include a washing machine with a zone in which washing occurs. The dispensed solutions can contain, for example, solid, powdered and liquid detergents; thickened aqueous detergent dispersions, viscous aqueous detergents, strippers, degreasers, souring agents, alkali metasilicates, alkali metal hydroxides, sequestering agents, enzyme compositions (lipolytic, proteolytic, etc.), threshold agents, dye, optical brightener, nonionic surfactant, anionic surfactant, fragrance, alkali carbonates, iron control agents, defoamers, solvents, cosolvents, hydrotropes, rinse aids, bleach, and/or fabric softeners. More specifically, in a laundry environment, detergent, bleach, souring agent, blueing agent, and fabric softener can be utilized sequentially. The souring agent is generally incompatible with the other products (e.g., the detergent is alkaline, the souring agent is acidic and the bleach is typically sodium hypochlorite). The ingredients in other cleaning processes can also be incompatible. For example, changing the operable pH can occur or chemicals can react, thereby reducing or destroying cleaning properties.

In view of such incompatibility, laundry machines have historically possessed cleaning solution dispensers having a manual system or a single independent delivery system for each solution. While a single independent delivery system for each solution is generally useful for its intended purpose, it is unnecessarily expensive since each independent delivery system requires its own pump, its own delivery conduit, and so on.

In response to the difficulties and high costs associated with the previous systems, great effort has been made to develop improved systems for the mixing and dispensing of chemicals. Examples of these systems include Kirchman, U.S. Pat. No. 4,691,850; Kwan, U.S. Pat. No. 4,090,475; Bauerlein, U.S. Pat. No. 2,823,833; Smith, U.S. Pat. No. 3,797,744; Marty, U.S. Pat. No. 4,941,596; Decker, U.S. Pat. No. 4,976,137 and Czeck et al., U.S. Pat. No. 5,203,366.6

The Kirchman patent discloses a time-based chemical dispensing system comprising two manifolds and a pump to draw the chemical components through a distribution manifold. Valves are positioned to allow the pump to draw one chemical at a time through the distribution manifold for a specified time. The chemical is then delivered through an outlet manifold into a container. Water is also delivered through the outlet manifolds to make up the aqueous composition. Both manifolds in the system are flushed after each chemical is dispensed, and the chemical input ports are arranged along the length of the manifold.

The Kwan patent discloses an apparatus for time-controlled sequential delivery of concentrates in water through solenoid valves. A pump draws the chemicals from supply containers. A flow meter is used for measuring flow rate at the outlet.

Bauerlein discloses a device for dispensing a proportionally diluted stream of chemical using the venturi principle. Valves are used to select from a plurality of concentrate supplies.

The Smith patent discloses a portable cleaning and sanitizing system comprising a plurality of pressurized chemical component tanks which are connected to a manifold and connected to a spray nozzle. The outlet of each component tank passes under pressure through a three way valve, metering valve, flow indicator and control valve prior to entry into the manifold. The chemical components are delivered at various points along the length of the manifold. However, this system is designed for use in sequentially delivering a plurality of cleaning compositions prepared by concurrently withdrawing and diluting the chemical components. The system meters and controls the flow of individual chemical components to continuously form the cleaning spray.

The Marty patent discloses a volume-based mixing system for use with concentrate liquids comprising a mixing manifold connected to a positive displacement pump. In the operation of this system, the manifold passageway is filled with water, a chemical concentrate supply valve to the manifold is open, and the pump is operated to draw a predetermined amount of water or carrier fluid from the manifold, drawing an equal volume of chemical concentrate into the manifold. The pump is operated for a given number of cycles to deliver a specified volume of chemical concentrate. This system further comprises a pressure regulator to maintain a predetermined pressure on the water or carrier fluid to allow for control of the system. Again, the chemical concentrate inlet ports are arranged along the length of the manifold.

The Decker patent discloses a chemical mixing and dispensing system comprising a manifold having a plurality of chemical component ports arranged along the length of the manifold. There are a plurality of chemical component supply pumps and valves for delivering the chemical components to the manifold under pressure. To provide quality control to the system, there are conductivity sensors, a weight measurement device at the filling station and electronic control means.

The Czeck patent discloses a system for the mixing and dispensing of chemicals. A positive displacement pump such as a gear pump is used to draw chemicals through a manifold with pneumatic valves for the selection of chemicals. One digital flow meter is used to measure the flow rate. A microprocessor is used for the control.

Each of these foregoing methods of diluting chemical concentrates includes a fixed orifice delivery of individual chemicals and water. Since the materials flow through a fixed orifice, these methods suffer from the inability to precisely control dilution of the chemical concentrate. More specifically, these delivery systems lack dilution control because they are viscosity dependent. Due to varieties of temperature and manufacturing parameters, among other factors, chemical product viscosities differ from container to container. Thus, when using these foregoing methods, different ratios of chemical concentrate and diluent are delivered depending on the viscosity of the concentrate.

U.S. Pat. No. 5,014,211 (issued to Turner et al) discloses a system which utilizes a single flow meter upstream from a manifold. A main transport pump is located downstream from the manifold and draws water through the flow meter and manifold. A plurality of secondary metering pumps are used in connection with the chemical concentrates to be pumped into the manifold. The disclosed device begins a cycle by pumping water through the manifold and measuring the water with the flow meter. The appropriate metering pump is then run for a predetermined amount of time based on the stored flow rate of that metering pump. One drawback of the disclosed device, however, is that the device assumes a constant flow rate for the transport pump in order to arrive at the flow rate of the metering pump (i.e., assumed constant flow rate of the metering pump minus the measured water delivered equals the delivered chemical). The device also utilizes conductivity proof of flow devices.

U.S. Pat. No. 5,246,026 (issued to Proudman) discloses a device which utilizes two flow meters—one upstream from a manifold and a second downstream from the manifold. A main transport pump is located downstream from both the manifold and second flow meter. The main transport pump draws water through the flow meters and manifold. Valves are used in connection with each chemical concentrate to be delivered into the manifold. The disclosed device begins a cycle by pumping water through the manifold and measuring the water with the flow meters. The appropriate chemical concentrate valve is then opened for a calculated amount of time—based on the difference between the two flow meters. The device, however, utilizes flow restrictors in the product concentrate pick-up lines which results in a large volume of water being delivered to the utilization point.

It will be appreciated by those skilled in the art that the amount of water delivered to the utilization point is also a factor in the cleaning process. Other factors include chemicals, mechanical action, time and temperature, with such factors being interrelated. By way of example, as the water level rises, the mechanical action decreases, thereby resulting in the need for more chemical to achieve the same cleaning. Further, if several different sized machines are utilized, the amount of water may completely fill one washer and be inefficient for another. Still further, the amount of dilution delivered should depend on the chemical being delivered. For example, in the case of bleach, a high volume should be delivered; while in the case of a sour, a low volume should be delivered.

In view of the foregoing, it will be appreciated that use of water flushes to deliver chemicals to the utilization point is a drawback. More specifically, water flushes are associated with flushing manifolds and delivering the diluted concentration to the utilization point. While a certain amount of flushing is useful to insure that the manifold and delivery lines do not retain incompatible chemicals, generally the amount of water required to push the dilutions to the utilization point is not controlled for the particular washer and use of the water to push the diluted concentration takes a relatively long period of time.

In view of the above, there is a need for a method and apparatus for accurately preparing and delivering chemical compositions by diluting chemical concentrates with an aqueous diluent at precisely controlled ratios which are suitable for the chemical being delivered and/or the specific utilization point/washing machine. There is also a need for preparing diluted chemicals compositions in optimized dilution ratios and delivering the same to washing zones. Still further, there is a need to provide for an alternative style of push of the chemical concentrate to the utilization point.

SUMMARY OF THE INVENTION

The present invention addresses the foregoing problems of the prior art industry by achieving more precise dilution control with a simple dilution system. The present invention achieves improved dilution control by adjusting the diluent flow to one of a plurality of specific preselected flow rates and then by monitoring the flow rate information from two flow meters. The present invention also delivers the diluted chemical to the desired washing zone through the use of an air push which allows a reduced and controllable amount of diluent to be used. Through the use of these and other improvements, productivity is enhanced and the desired concentration of chemical is more accurately delivered for use at a utilization point in a controllable amount of diluent.

The invention provides structures for drawing a measured volume of a chemical concentrate from a container, diluting it in a mixing manifold with diluent, and delivering the diluted chemical to a distribution manifold system. More specifically, in an apparatus constructed according to the principles of the invention, first a diluent flow is established through a mixing manifold. Once the flow stabilizes, flow meters measuring the diluent inflow and mixing manifold outflow are calibrated. Having established a stable, known flow rate, a chemical concentrate valve is opened. Immediately after the chemical concentrate valve opens, the diluent flow through the mixing manifold is reduced by a metering means, thereby increasing the mixing manifold vacuum and drawing the chemical concentrate into the mixing manifold where it is combined with diluent.

In a preferred embodiment, a control means receives flow rate information from the two flow meters. The first flow meter measures the flow of the diluent into the mixing manifold. The second flow meter measures the combined flow of diluent and chemical concentrate from the mixing manifold. By comparing the information from the first and second flow meters, the actual dilution of the chemical concentrate can be determined. Since the invention uses flow rate information to achieve the proper dilution ratio of the chemical concentrate, the dilutions of the invention are not affected by chemical concentrate viscosity.

One feature of the preferred apparatus is the inclusion of an optional second system. The second system includes essentially all of the components of the first system, with the exception of a common water supply, control means, and distribution manifold. The second system preferably includes a larger transport pump in order to provide functionality for delivering product simultaneously to the same washing zone (e.g., surfactants and alkalis), simultaneously to a second washing zone, and/or for delivering higher volume dilutions.

Another feature of the present invention is the provision of an air push to deliver the diluted chemicals to the washing zones. The air push preferably operates after the diluted chemicals have exited the mixing manifold and have been delivered to a distribution manifold. By providing an air push, the diluted chemicals are delivered faster and more efficiently with a controlled amount of diluent. Additionally, by providing an air push, the next dispense cycle can begin sooner, resulting in less queuing of requests.

Still another feature is the provision of a utilization point command stacking feature. Since the preferred embodiment includes a controller means, commands may be stacked using software-based logic flow to act on requests from the various washing zones in a predetermined hierarchy. This feature provides for more flexibility in delivering diluted chemicals to a plurality of washing zones which are requesting various chemicals during the approximate same times.

An additional option of the present invention is to provide a real-time adjustment of the metering means based on the difference between the flow meters. For example, if the actual dilution is outside a preset range, then the control means can send a signal to the metering means to adjust the diluent flow to achieve the proper dilution ratio.

Therefore, according to one aspect of the invention, there is provided an apparatus for preparing a chemical composition by diluting a chemical concentrate with a diluent, the apparatus comprising: metering means for controlling the output of a diluent from a diluent source; a source of a chemical concentrate; a mixing manifold, in fluid communication with the metering means and the source of chemical concentrate, for mixing the diluent with the chemical concentrate to form a chemical composition, and wherein the mixing manifold includes an outlet port; control means for determining a dilution ratio and generating the control signal for said metering means; and a source of air, operatively connected to the outlet port for pushing the chemical composition to the utilization point.

According to another aspect of the invention, there is provided a method of preparing chemical compositions with improved control of dilution precision, comprising the steps of: pumping a diluent from a diluent supply into a metering system having variable diluent metering means; generating a first signal indicating the flow rate of the diluent from the metering system into a mixing manifold by means of a first flow meter; drawing a chemical concentrate from a container into the mixing manifold whereby a chemical composition is formed; generating a second signal indicating the flow rate of the chemical composition from an outlet port of the mixing manifold by means of a second flow meter; determining the dilution of the chemical concentrate by comparing the first and second signals and generating an error signal from a predetermined difference and the actual difference between the first and second signals; and pushing the diluted chemical concentrate to a utilization point with air, whereby the accuracy of the desired chemical composition dilution is improved and the delivery time is shortened.

According to yet another aspect of the invention, there is provided an apparatus for preparing chemical compositions by diluting chemical concentrates with improved dilution precision, the apparatus being operatively connected to a metering means for controlling the output of a diluent from a diluent source, wherein said metering means includes a diluent metering means and first flow rate measuring means for generating a first signal indicating the flow rate of the diluent from the metering means; a source of a chemical concentrate; a mixing manifold in fluid communication with said metering means and said source of chemical concentrate for mixing the diluent with the chemical concentrate wherein said metering means includes an outlet port; second flow rate measuring means for generating a second signal which is an indication of the flow rate of the chemical composition from the outlet port of the mixing manifold; and a control means comprising a central processor for receiving said first and second signals, determining a dilution ratio, generating a control signal to control the dilution of the chemical concentrate whereby said control signal adjusts the diluent flow rate by adjusting the diluent metering means.

These and other advantages and features which characterize the present invention are pointed out with particularity in the claims annexed hereto and forming a further part hereof. However, for a better understanding of the invention and the advantages obtained by its use, reference should be made to the drawing which forms a further part hereof, and to the accompanying descriptive matter, in which there is illustrated and described a preferred embodiment of the present invention.

DETAILED DESCRIPTION AND PREFERRED EMBODIMENT OF THE INVENTION

Figure 1:
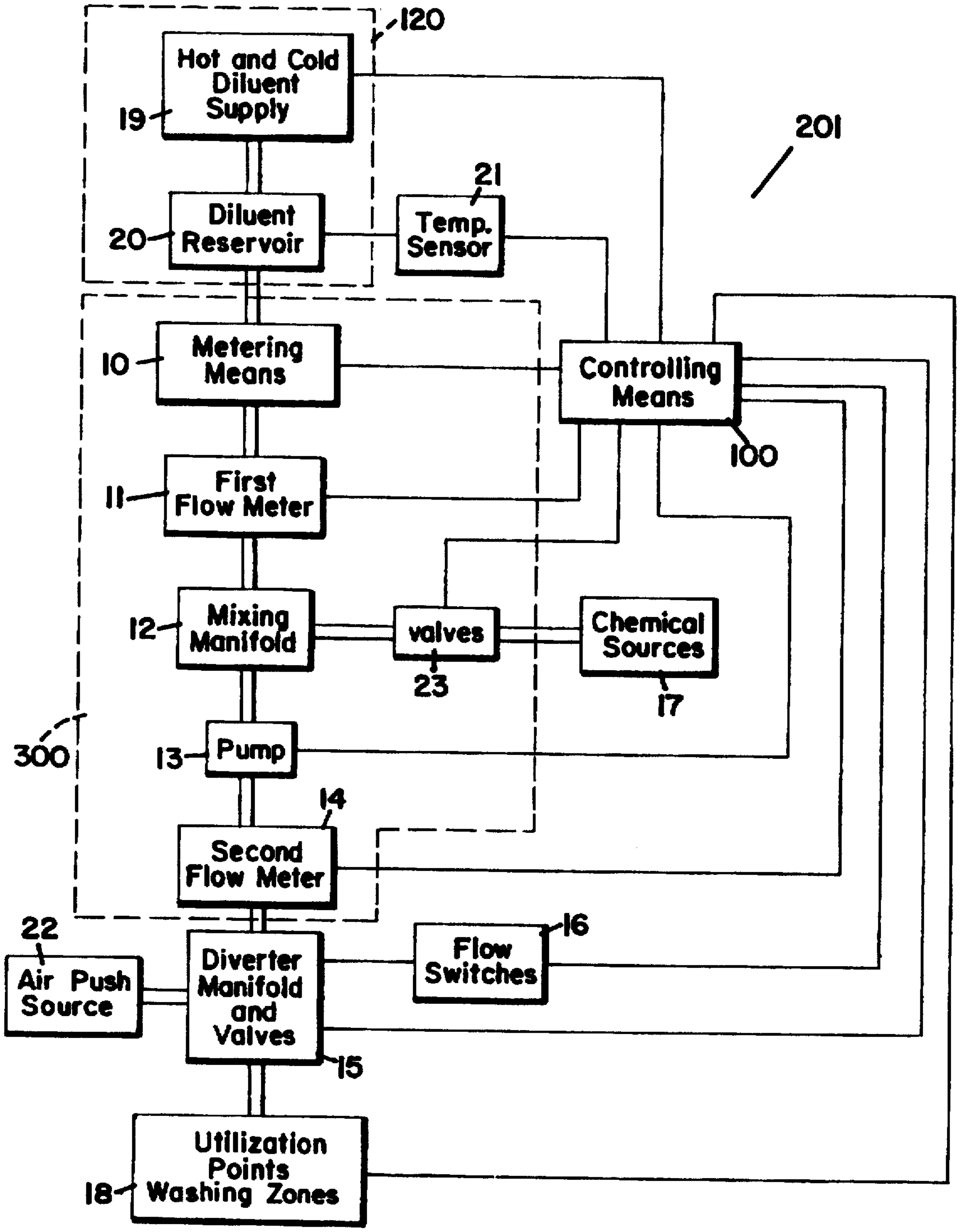
FIG. 1 illustrates a functional block diagram of a preferred embodiment liquid chemical dilution and dosing system 201 constructed in accordance with the present invention.

Referring now to the drawing, wherein like numerals represent like parts throughout the several views, there is generally disclosed at 201 a liquid chemical dilution and dosing system apparatus constructed in accordance with the present invention. The dilution system 201 generally includes a mixing system 300, a controller means 100, a diluent supply 120, a plurality of chemical sources 17, a diverter manifold 15, and an air push source 22. The diluted chemicals are delivered to one or more utilization points 18, which in the preferred environment is a plurality of laundry washing machines (each of which includes washing zones).

In general, the dilution system 201 according to the invention draws a chemical concentrate from one of the sources 17 (best seen in FIG. 2 and designated as **17*a*–17*l*) by reduced pressure, dilutes it in the mixing manifold 12 with diluent and delivers the chemical composition to a utilization point 18**.

Figure 2A:
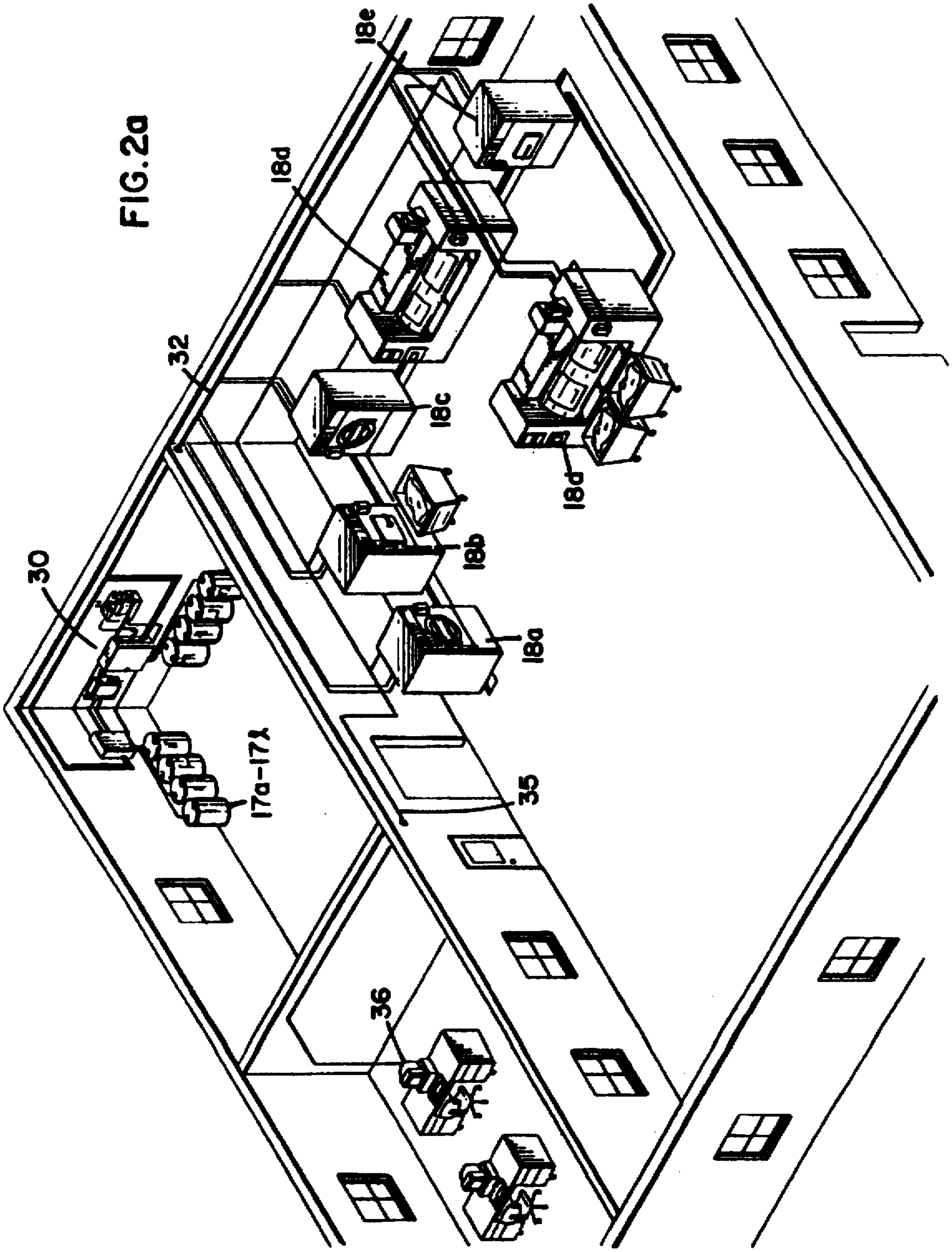
FIG. 2*a* illustrates an embodiment of the present invention utilized in a commercial laundry environment.

In a typical preferred embodiment, the chemical concentrates and the present invention are employed in a commercial laundry as shown in FIG. 2*a*. Dilution and dosing system 201 (best seen in FIG. 1) is located in enclosure 30. Chemical concentrates **17*a*–17*l* are illustrated as being located proximate the enclosures 30. FIG. 2a illustrates fluid communication lines 32 running from the diverter manifold 15 to the washing machines/utilization points 18. As will be described further below, an air push is utilized to deliver the diluted chemicals to the utilization points 18. Computer 36 may also be employed to assist in data logging and/or programming the operation of washers 18a–18e and the dilution and dosing system 201. Electrical cabling 35** may be employed to send and/or gather real time data and instructions.

Figure 2B:
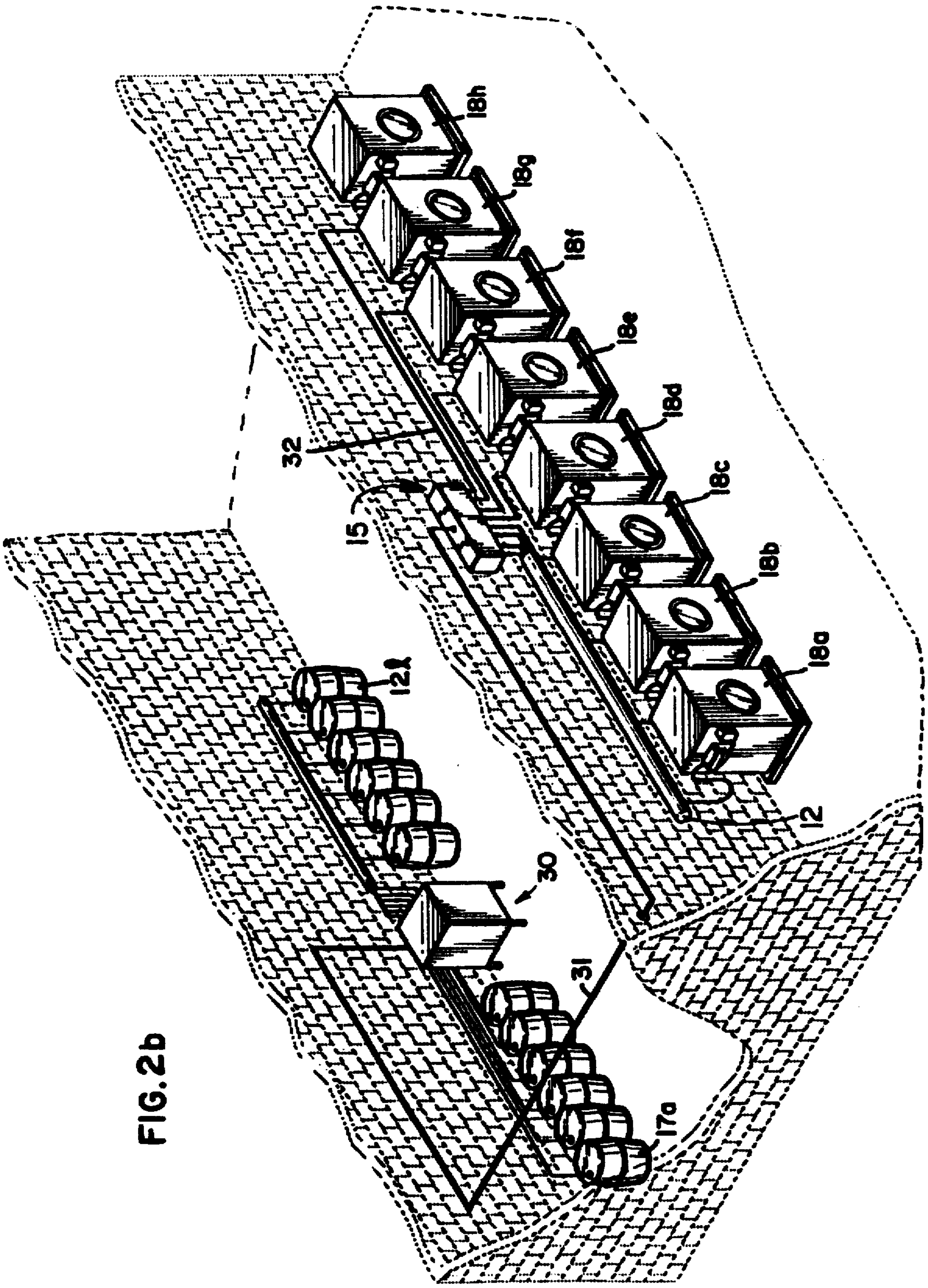
FIG. 2*b* illustrates an alternative embodiment of the present invention utilized in a commercial laundry environment.

In FIG. 2b, an alternative environment is illustrated. However, it will be appreciated by those skilled in the art that the principles of the present invention may be employed in any number of other environments as well. Dilution and dosing system 201 is located in enclosure 30. FIG. 2b further illustrates a single fluid communication line 31 running from enclosure 30 to the diverter manifold 15. However, such diverter manifold 15 is preferably located within the same enclosure 30 and a plurality of fluid communication lines 32 are utilized in a one-to-one manner with the washing machines/utilization points 18a–18h.

A nonexclusive list of chemical concentrates which may be provided to the typical embodiment utilization point/wash zone include a detergent, a fabric softener, a bleach and a souring agent. These bulk chemical concentrates are diluted according to the principles of the invention, and delivered to a laundry machine 18a–18h by the product diverter means 15. It will be appreciated that the exact number of chemical concentrates may vary from application to application.

Diluent source 120 includes sources of hot and cold diluents with appropriate valves 19 and a diluent reservoir 20. The diluent supply and valves 19 are in fluid communication with the diluent reservoir 20. The diluent reservoir 20 is in further fluid communication with the metering means 10 (discussed below) which is in turn in fluid communication with flow rate measuring means 11. The measuring means is preferably a turbine flow meter, of the type manufactured by Micro-Trak Systems and designated by the model number FM 500-H. While impeller type meters are used in the preferred embodiment, other types of flow rate measuring devices might also be used.

During normal operation, the diluent level in the reservoir 20 is maintained at the full level and the diluent temperature is established between a high and a low set point. The level sensors 111 (best seen in FIG. 3) measure when the diluent level is becoming depleted such that the reservoir 20 can be refilled by activating the hot and/or cold diluent valves 19 as required to maintain the reservoir diluent within the acceptable level and temperature ranges.

A high diluent level sensor 111 prevents the reservoir 20 from overfilling. A low level sensor 111 signals when diluent has been drawn from the reservoir 20 and additional diluent is to be added through the diluent valves 19. A temperature sensor 21 monitors the temperature of the diluent in the reservoir 20.

Before proceeding with a description of the other elements of the structure of the preferred embodiment of the present invention, it should be understood that the various elements making up such structure should be selected from materials which withstand the various chemicals being diluted and will not leech. Additionally, it should be noted that while FIG. 6 provides a preferred arrangement of the various components of the mixing system 300 and distribution manifold means 15, the detailed description of the various elements will be made in connection with the functional elements set forth in FIGS. 1 and 3–9.

Mixing System 300

Referring again to FIG. 1, mixing system 300 is comprised of a metering means 10, a first flow meter 11, a mixing manifold 12 (with an outlet port), a pump 13, a second flow meter 14, and a diverter manifold 15. It will be appreciated by those skilled in the art that the functional blocks in FIG. 1 which are in fluid communication are connected to one another by double lines. Further, those functional blocks which are in electrical signal communication are connected to one another by single lines.

Figure 4:
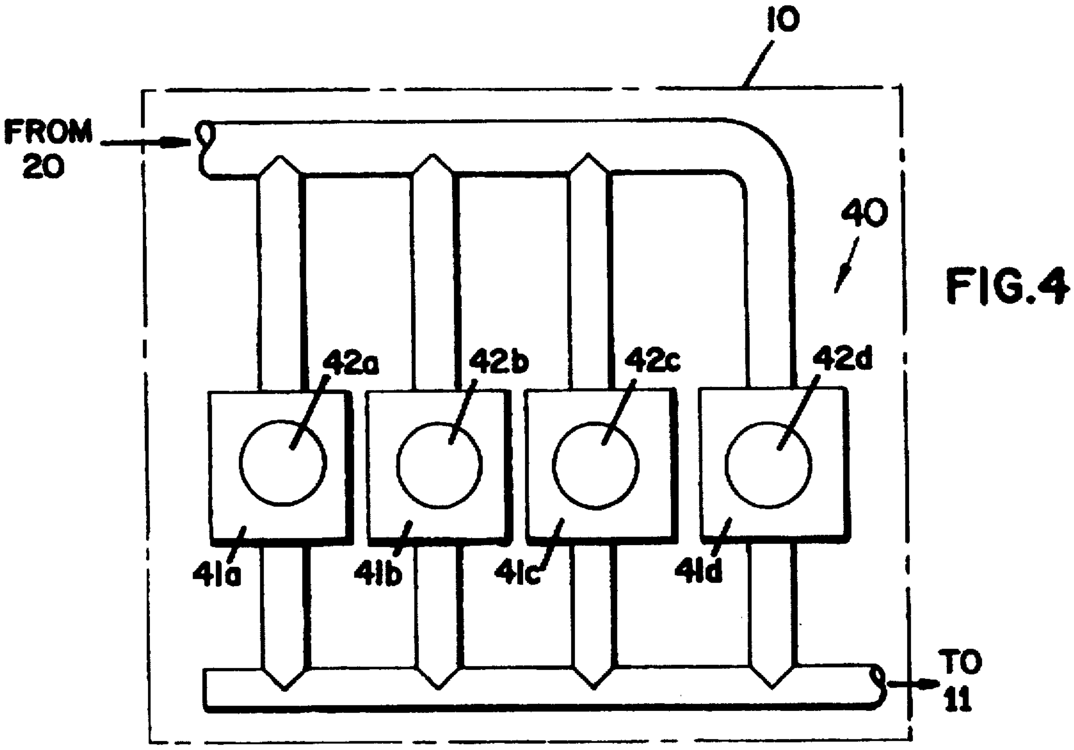
FIG. 4 illustrates a preferred embodiment of the metering means 10 of the invention shown in FIG. 1.
Figure 5:
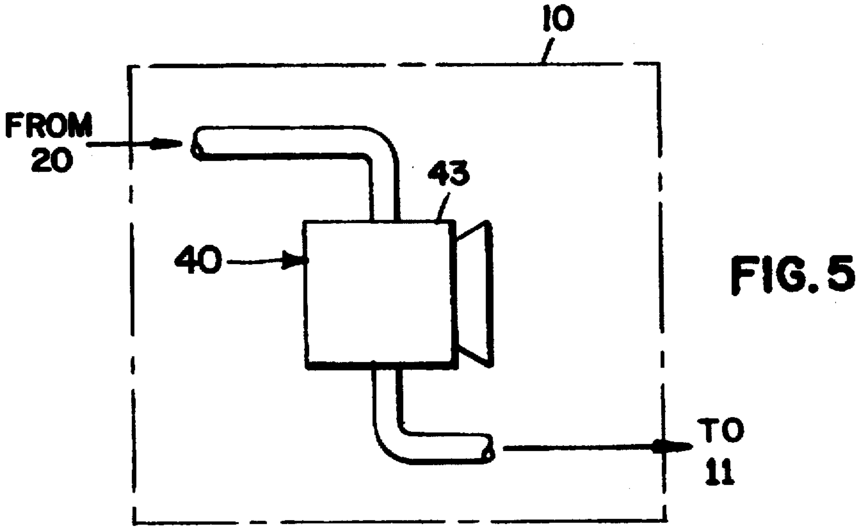
FIG. 5 illustrates an alternative embodiment of the metering means 10 of FIG. 4.
Figure 6:
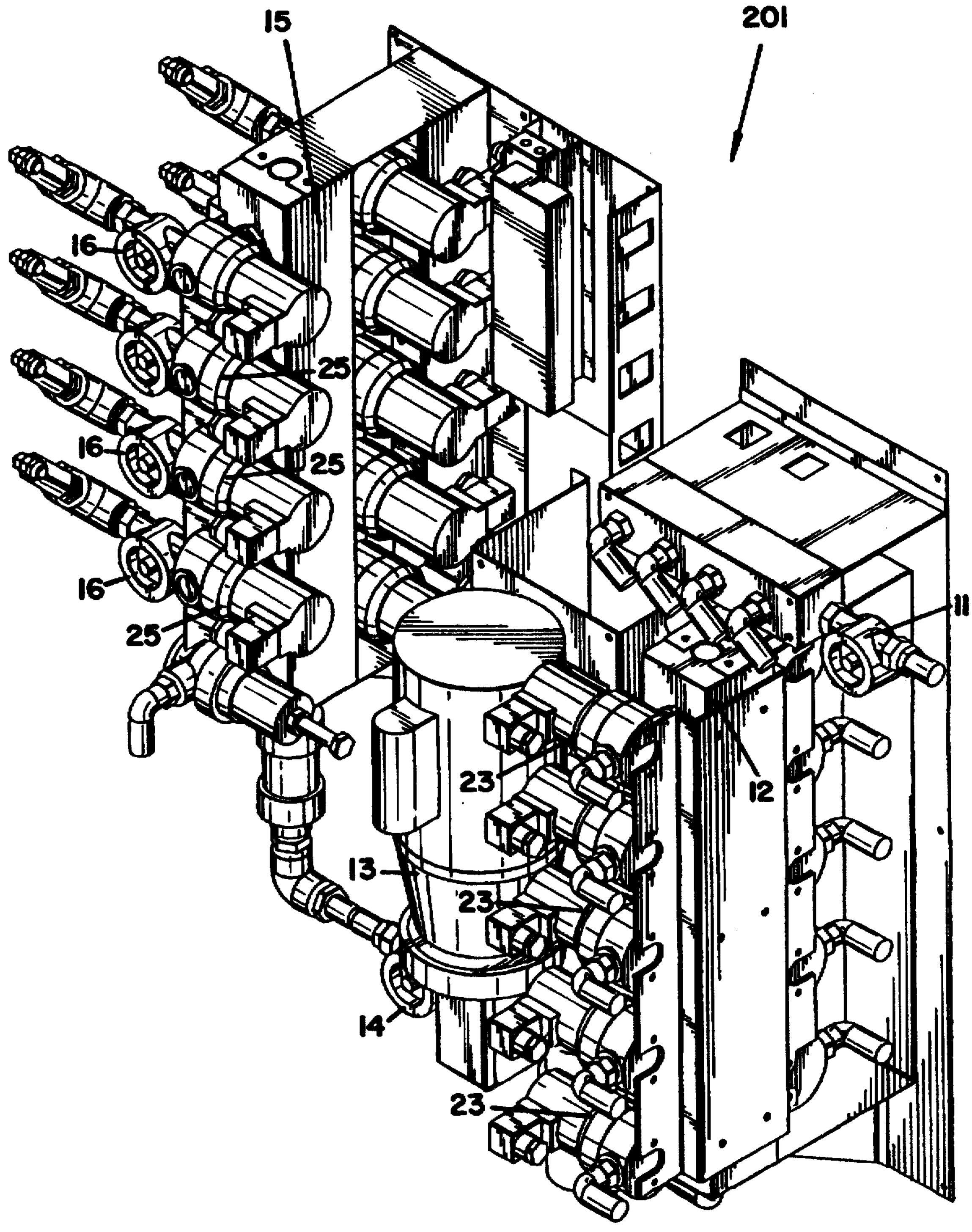
FIG. 6 illustrates a perspective view of a preferred embodiment mixing system 300 shown in FIG. 1.

Next referring to FIGS. 4 and 5, the metering means 10 generally includes diluent metering means 40 such as multiple diluent entry valves 41a–41d having different sized metering orifices 42a–42d (best seen in FIG. 4) or a single variable flow valve 43 (best seen in FIG. 5) such as a throttling valve, a variable diameter orifice, a pinch tube and a needle valve. In a preferred embodiment the metering means 4 comprises four diluent entry valves 41a–41d and four different sized metering orifices 42a–42d. The diluent entry valves 41a–41d can be of the direct actuated valve type. One manufacturer of valves of this style is Eaton Corp. of Carol Stream, Ill. The diluent entry valves 41a–41d are connected in parallel to one another. Further, the corresponding metering orifices 42a–42d are sized differently to one another. Therefore, by activating one or more diluent entry valves 41a–41d, 16 different diluent flow rates can be achieved (e.g., $2^4$ possible combinations of valves 41a–41d being opened or closed are possible). Preferably, the diameters of the different restrictive orifices 42a–42d are in a 1:2:4:8 ratio. However, those skilled in the art will appreciate that other ratios and number of valves may be used.

Table 1 below illustrates how the sixteen different flow rates are achieved from the four metering orifices sized in a 1:2:4:8 ratio.

TABLE 1

| 1 | 2 | 4 | 8 | Area |
|---|---|---|---|---|
| 0 | 0 | 0 | 0 | None |
| 1 | 0 | 0 | 0 | X |
| 0 | 1 | 0 | 0 | 2X |
| 1 | 1 | 0 | 0 | 3X |
| 0 | 0 | 1 | 0 | 4X |
| 1 | 0 | 1 | 0 | 5X |
| 0 | 1 | 1 | 0 | 6X |
| 1 | 1 | 1 | 0 | 7X |
| 0 | 0 | 0 | 1 | 8x |
| 1 | 0 | 0 | 1 | 9X |
| 0 | 1 | 0 | 1 | 10X |
| 1 | 1 | 0 | 1 | 11X |
| 0 | 0 | 1 | 1 | 12X |
| 1 | 0 | 1 | 1 | 13X |
| 0 | 1 | 1 | 1 | 14X |
| 1 | 1 | 1 | 1 | 15X |

X = minimum amount of diluent flow through the metering means
1 = valve is open
O = valve is closed It will be appreciated that the flow rate will vary in accordance with well known fluid dynamic principles.

As noted above, the metering means provides the functionality for variable levels of diluent flow. In practice, any method of diluent restriction may be used including multiple diluent valves with different size metering orifices, a throttling valve, a variable diameter orifice, a pinch tube or a needle valve. By providing a differential metering means, an appropriate volume of diluted chemical and diluent is delivered to the washing zone. This can be an especially effective method of delivering diluted chemicals in an efficient manner for several reasons. By way of example, the size of the washing zone may require that a smaller volume of diluent be delivered. Further, the type of chemical may require that the dilution concentration be controlled.

Returning again to FIG. 1, the mixing manifold 12 is in fluid communication with the first flow meter 11, at least one chemical concentrate source 17 and a pump 13. In the preferred embodiment, the pump 13 is a gear type pump. One manufacturer of these types of pumps is Oberdorfer. The pump 13 may be a 2.8 gallons per minute pump designated by model number 2908-D5-8 (if a second larger pump is also used, then such pump may be an 8.0 gallons per minute pump also manufactured by Oberdorfer and designated by the model number 2908DS).

Chemical concentrate valves 23 are positioned in fluid communication between the mixing manifold 12 and each chemical concentrate source 17. Valves 23 provide for selective delivery of chemical concentrates and are operated by signals from control means 100 (described below). Valves 23 are normally closed and are opened when the chemical is desired. In the preferred embodiment, the chemical concentrate valves 23 are manufactured by GEMS and have a model designation of 202-15-E-1-1-5-1-24-60.

The pump 13 is in fluid communication with a second flow rate measuring means 14 which can similarly be a flow rate meter as described above. The second flow meter 14 is in fluid communication with a product diverter means 15.

Diverter Means 15

Figure 8:
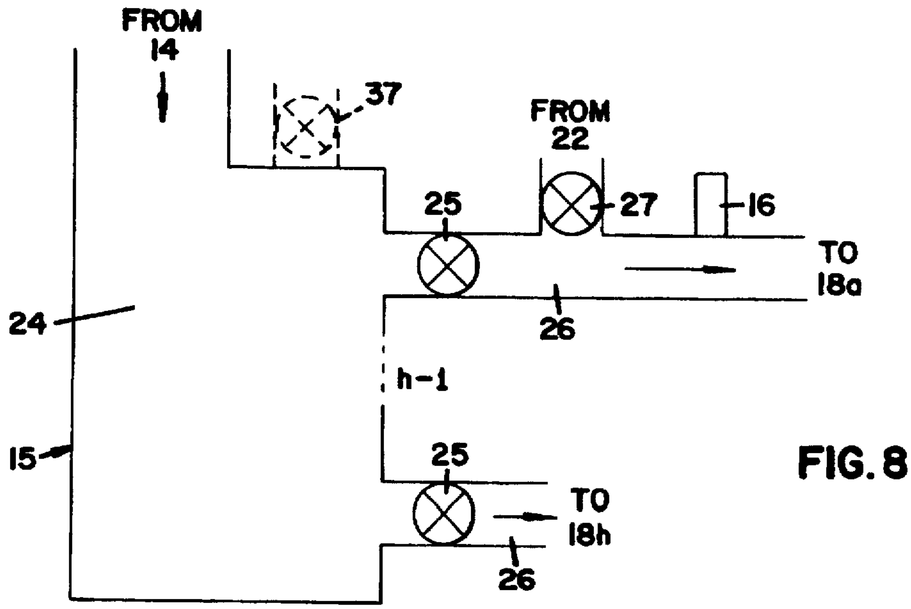
FIG. 8 illustrates schematically the arrangement of the diverter manifold 15 of FIG. 1.

Referring to FIGS. 1 and 8, the product diverter means 15 includes a distribution manifold 24, one or more distribution valves 25, and an outlet 26 for each distribution valve. An air push source 22 is also in fluid communication with the outlets 26 and are connected via valves 27. Flow switches 16 are also located within the outlets 26.

There is a separate distribution valve 25 in fluid communication between the distribution manifold 24 and each outlet 26 in order to provide selective control and delivery of the chemical composition to one of many utilization points 18*a*–18*h*. It will be appreciated that the number of distribution valves 25 and outlets 26 will vary with the number of utilization points and the number illustrated herein is provided by way of example.

In the preferred embodiment, the distribution valves 25 used are manufactured by GEMS as discussed above in connection with the chemical concentrate valves 23.

An alternative location for the fluid communication between air push source 22 and distribution manifold 24 is designated as 37 in FIG. 22. This optional location 37 provides for a single valve arrangement for the entire manifold 24.

Air Push

The present invention also provides for an air push by closing the distribution valve 25 and opening an air inlet valve 27. This places the air push supply 22 in fluid communication with the outlet 26. The air push supply may be a compressed air tank or other source of plant air. Generally, the pressure of such supply is preferably below 15 pounds, however, any pressure may be utilized—especially if a pressure restrictor device is used.

The air push delivers the diluted chemicals more rapidly than other systems relying on water. Additionally, the air push provides that a more controllable amount of diluent and chemical are provided to the utilization point. This results in a more exact dilution ratio, as well as limiting the volume of diluent within the laundry machine. Another benefit of the air push is that it speeds up the dispense cycle so that the next request can be handled more rapidly.

In the preferred embodiment, the air inlet valves 27 are manufactured by MAC and have a model number designation 35A-B00-DACA-1BA. The delivery lines 26 which provide the fluid communication to the utilization points 18 are preferably ¾ inch I.D. for a high volume system and ½ inch I.D. for a low volume system (a two volume system is discussed below in connection with the alternative embodiment). It will be appreciated that the diameter of the delivery lines are sized and configured in accordance with the volumes of concentrates, air push effectiveness, and pumps used.

To determine the time required to provide the air push, methods commonly known in the art of fluid mechanics are used. By way of example, at 15 psi air pressure, a ¾ inch I.D. line will evacuate water from the pressure source at approximately 30–40 feet per second on the horizontal run.

Control Means 100

Figure 3:
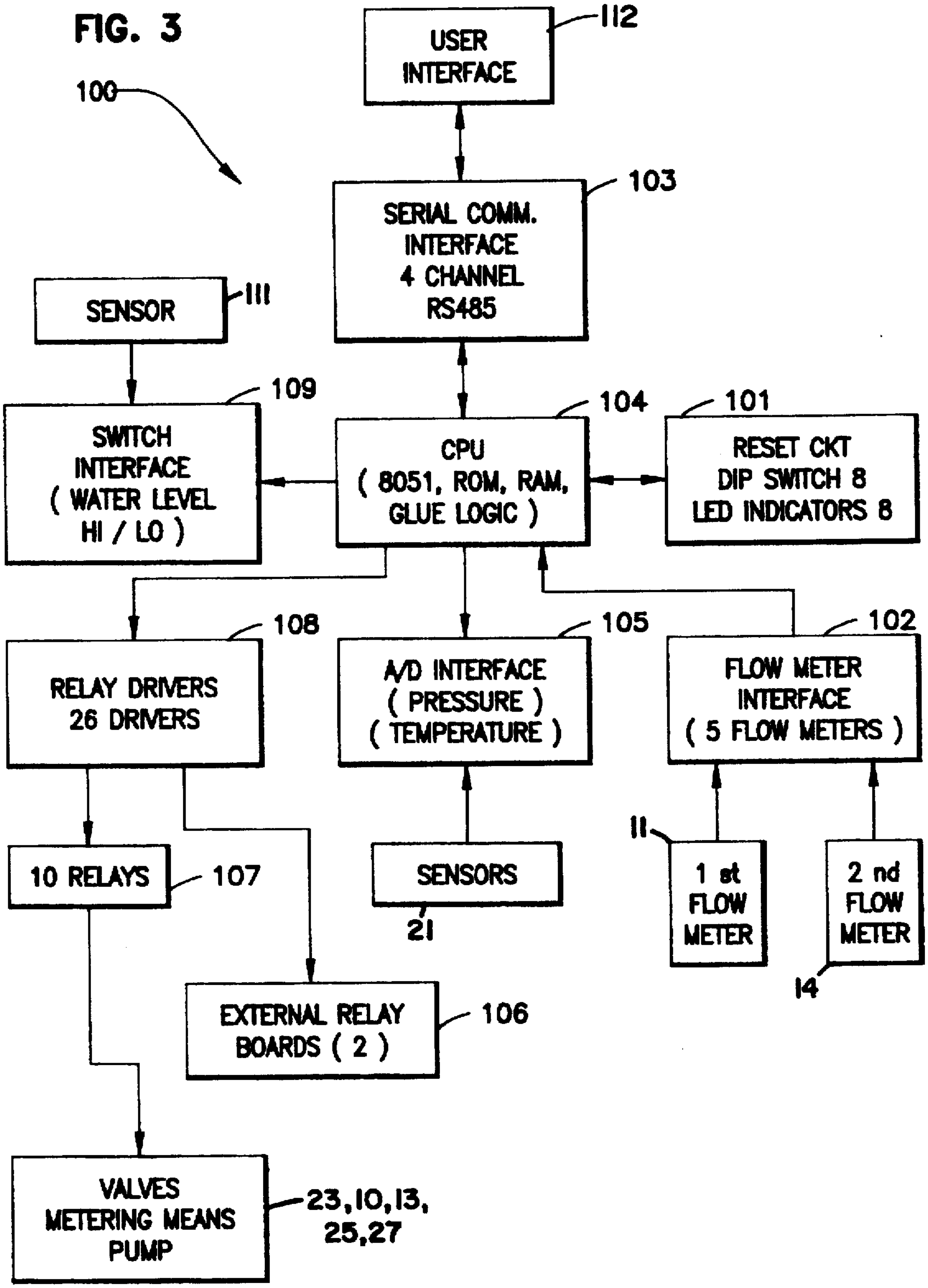
FIG. 3 illustrates a functional block diagram of the control means 100 of the invention shown in FIG. 1.

Referring now to FIG. 3, there is illustrated a functional block diagram of a preferred embodiment of a control means 100 configured in accordance with the principles of the present invention. The central processor and its peripheral components are generally referred to by the reference numeral 100. The control means 100 is illustrated in FIG. 3 as including a CPU 104, a serial communication interface block 103, a switch interface block 109, a reset circuit, DIP switch and LED indicators block 101, relay drivers 108, relays 107, an external relay board 106, A/D interface block 105 and a flow meter interface 102.

The CPU 104 comprises a 80C51 FA CPU chip, 64 Kbyte ROM containing the firmware for controlling the system 100, 32 Kbyte RAM for data storage and retrieval and various "glue" logic for interfacing the CPU 104 to the peripheral chips and devices. The CPU 104 is connected to the A/D interface 105, the flow meter interface 102, the reset circuit, DIP switch and LED indicators 101, the serial communication 103, the switch interface 109 and the relay drivers 108.

The A/D interface 105 uses two (0 to 5 volt) 8 bit A/D converter channels to convert the diluent reservoir 20 temperature and an optional vacuum level of mixing manifold 10 into an 8 bit value for processing by the CPU 104.

The flow meter interface 102 provides signal conditioning to improve noise immunity and reduces the 0–12 volt flow meter output into a 0–5 volt signal to be read by the CPU 104.

The reset circuit, DIP switch and LED indicators 101 are comprised of a reset circuit for generating a reset signal after power-up, or in the event of a noise induced CPU crash. The DIP switch is used to configure the system for special modes of operation either in the field or in a system production setting. The LED indicators are used to indicate fault conditions or diagnostic conditions in the field or in a production setting.

Serial communication block 103 includes 4 bi-directional RS-485 serial communication ports operating at 9600 baud. User interface modules are connected to the control cabinet through this interface. User interface block 112 provides for reporting dispensing activity and washing machine (i.e., utilization point 18) status.

The switch interface 109 is the interface between the water reservoir level sensor 111 and the CPU 104.

The relay drivers 108 comprises relay driver circuitry used to energize the various valves, pumps, and relays in the system 201. The relay drivers 108 are connected to the CPU 104, 10 relays block 107 and an external relay board 106. In the preferred embodiment, the relays 107 reside on the CPU board and are used to control 120 VAC actuators. The relays 107 are connected to the relay drivers 108 and the various valves (23, 25, 27), metering means 10, pumps 13, etc. collectively illustrated as a single block in FIG. 3.

The external relay board 106 are relays used for controlling additional actuators. The external relay board 106 is connected to the relay drivers 108.

While not specifically detailed in FIG. 3, it will be understood that the various electronic devices, memory, and microprocessors are to be properly connected to appropriate bias and reference supplies so as to operate in their intended manner. Similarly, it will be understood that appropriate memory, buffer and other attendant peripheral devices are to be properly connected to the CPU 104 so as to operate in its intended manner.

Working Example

Figure 9:
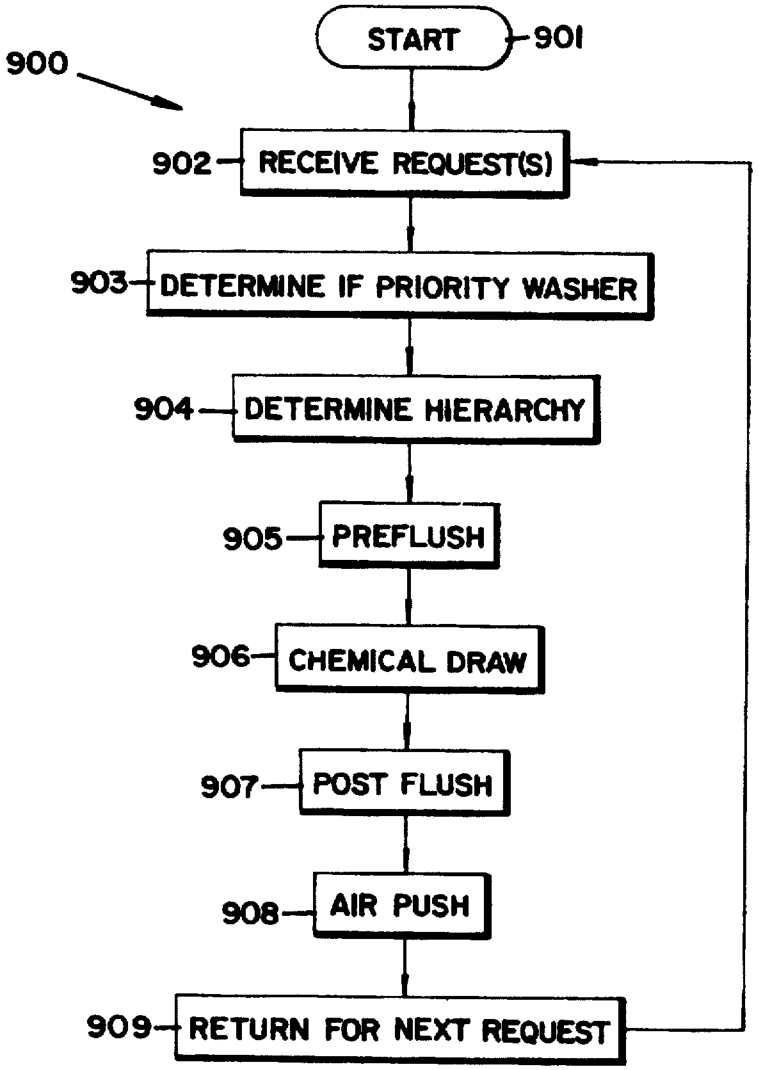
FIG. 9 is a logic flow diagram of preferred programming steps of the controller means of the present invention.

By way of example, the controller means 100 of the dilution and dosing system 201 may operate in accordance with the following programming logical steps which are set forth in FIG. 9. The program is generally illustrated at 900 and begins at block 901.

At block 902, requests from a utilization point 18 are received by the controller means 100.

At block 903, controller means 100 determines if the request is from a priority washer. It will be appreciated by those skilled in the art that for various reasons it may be advantageous to prioritize requests from certain utilization points globally (e.g., for size reasons, types of laundry, etc.). In those instances, the requests from that utilization point (e.g., requesting washer) can be designated as a "priority product" (discussed below) in order to deliver them to the priority washer more rapidly.

The requests are handled at block 904 in accordance with the hierarchy set forth in Table 2.

Table 2 i. Each request can be deferred only once.

ii. A priority product.

iii. First in, first out.

A priority product may be defined by the user.

In the preferred environment, priority products are those products with short laundry cycles or other chemicals which should not be delayed (such as sour or softener).

Although only two levels of priority are illustrated in Table 2, it will be appreciated that any number of levels of priority might be utilized in the hierarchy. By way of example, Table 2 illustrates that the priority product is either a priority product or is not (e.g., two levels of priority). However, it will be appreciated that any number of priorities might be utilized in order to establish a priority of "priority products." Similarly, higher ranking priority washers, etc. might be established. In the event that priorities of requests are otherwise even, in the preferred embodiment, the first request received is acted on.

At block 905, the preflush step occurs. The metering means 10 is opened to its widest setting, the pump 13 is turned on and the appropriate valve 25 is opened for the requesting laundry machine. Around 10 seconds of diluent/water are delivered. During this time the first 11 and second 14 flow meter are calibrated to one another.

At block 906, the chemical draw step occurs. The appropriate valve 23 is opened and the metering means 10 is immediately adjusted to a smaller setting. The valve 23 is left open for a period of time dependent upon the difference between the first and second flow meters 11 and 14. The time to draw the chemical to the mixing manifold 12 essentially depends upon two factors:

a) Number of ounces desired; and b) Viscosity of chemical (e.g., bleach flows relatively faster than alkalis).

After the desired ounces have been metered, the product valve 23 shuts. At this time, chemical is at the mixing manifold 12 and part way to the utilization point, but is not totally delivered.

At block 907, the post flush occurs. Diluent/water is used to further deliver the chemicals and to substantially remove traces of the chemical concentrates from the mixing 12 and distribution 24 manifolds.

The following Table 3 includes representative test results regarding water pushes. The time and flush ounce data associated with column I is from a device using solely a water push. The time and flush ounce data associated with column II is from a device constructed in accordance with the principles of the present invention which uses a water flush followed by an air push.

TABLE 3

| Chemical | I. Time | Flush Oz. | II. Time | Flush Oz. |
|---|---|---|---|---|
| Detergent | 1:02 | 576 | .10 | 200 |
| Builder | :51 | 448 | .10 | 200 |
| Bleach | :48 | 352 | .10 | 200 |
| Sour/Softener | :41 | 576 | .10 | 100* |

*The data in column II is using an eight gallon/minute pump, with the exception of the sour which is delivered using a four gallon/minute pump.

At block 908 the air push occurs. After the post-flush, the metering means 10 is closed, pump 13 is turned off, valve 25 is closed, and valve 27 is opened. The air push source 22 is then in fluid communication with the outlet 26 and so effectively "pushes" the post flush diluent through the delivery conduit to the utilization point.

At block 909, the controller means 100 returns to block 902 to handle the next request (or the next request in the hierarchy).

In Operation

In operation, when the system is initiated, the pump 13 is energized and draws diluent from the reservoir 20. When the diluent level is reduced to the low set point, the control means 100 activate the diluent valve 19 to replenish the reservoir 20 with diluent and to raise the level back to the full level. Before the diluent valve 19 is operated, the control means 100 read the temperature sensor 21 to determine if the hot or cold diluent valve 19 is to be opened first. Monitoring of this temperature is required to maintain the diluent temperature between the hot and cold set points.

A metering means 10 (including a diluent metering means 40) controls the flow of diluent from the reservoir 20 into mixing manifold 12. Preferably, prior to mixing manifold 12, the diluent also flows through a first flow meter 11. The metering means 10 is selectively actuated to provide different diluent flow rates into the mixing manifold 12. The metering means 10 may also contain a vacuum sensor (best seen as part of functional block 21 in FIG. 3).

The diluent flows from the metering means 10 through an inlet port into the mixing manifold 12. In the mixing manifold 12, the diluent is combined with a chemical concentrate from source 17. The chemical concentrate flows from the source 17, through a chemical concentrate valve 23, into the mixing manifold 12. The diluent combines with the chemical concentrate in the mixing manifold 12 to form a chemical composition and flows through an outlet port of the mixing manifold through pump 13 to a second flow meter 14.

Preferably, the pump means 13 is in fluid communication with the outlet port of the mixing manifold 12 and transports the chemical composition to a product diverter manifold 15.

The product diverter manifold 15 comprises a distribution manifold 24 and at least two distribution valves 25 for the delivery of each chemical composition to a corresponding utilization point 18. In one embodiment of the present invention the utilization point 18 is a laundry washing machine 18*a*–18*l*. Preferably, the diverter manifold 15 includes a proof of delivery sensor 16.

As discussed above, there is a control means 100 comprising a central processor 104 for receiving the first and second signals, generated by first and second flow meters 11 and 14 respectively and controlling the dilution of the chemical concentrate.

In a preferred embodiment, the control means 100 preferably opens all four diluent entry valves 41*a*–41*d* and activates the pump means 13 drawing on the diluent in the reservoir 20. This is defined as the pre-flush period, and lasts long enough to establish a diluent flow through the pump 13.

Once diluent flow has been established, any variation in the first and second flow meters 6 and 19 is zeroed out. This is a system calibration step.

Once the system 201 has been stabilized and calibrated, the appropriate chemical concentrate valve 23 is opened by CPU 104 activating the appropriate relay drives 108 and relay 107. Immediately after the chemical concentrate valve 23 opens, a diluent entry valve 41*a*–41*d* (or combination of the four diluent entry valves 41*a*–41*d*) are systematically closed (by signals from CPU 104 through the appropriate relay drivers 108 and relay 107) to increase the mixing manifold 12 vacuum and draw chemical concentrate into the mixing manifold 12 for dilution of the chemical concentrate.

Each of the four diluent entry valves 41*a*–41*d* contain a restrictive orifice 42*a*–42*d*. Each orifice 42*a*–42*d* is sized differently such that any single valve or combination of these valves 41*a*–41*d* is activated at any one time to obtain sixteen different diluent flow rates. Preferably, the first valve orifice 42*a* is the smallest diameter required for proper operation. The second valve orifice 42*b* is two times the effective area of the smallest diameter. The third 42*c* is four times the effective area of the smallest diameter. The fourth 42*d* is eight times the effective area of the smallest diameter.

In an alternate embodiment, a single variable flow valve 43 is utilized as the diluent metering means 40. This variable flow valve 43 can provide a continuous range of possible diluent flow rates.

With the chemical concentrate valve 23 open, and the four diluent entry valves 41*a*–41*d* modulated, chemical concentrate is drawn into the mixing manifold 5, and the first and second flow meters 11 and 14 will read different amounts.

The first flow meter 11 located before the mixing manifold 12 reads actual diluent amounts. The second flow meter 14 reads a greater amount of fluid as the chemical concentrate and the diluent are drawn through this meter 14 together. The flow meter 11, 14 readings are transmitted as first and second signals, respectively to the flow meter interface 102 and then to the CPU 104.

The readings from the first flow meter 11 are subtracted from the readings of the second flow meter 14 by the central processor 104 to determine the actual amount of chemical concentrate being delivered. By accumulating the differences, the amount of chemical delivered to the utilization point may be determined.

Optionally, the readings from the first flow meter 11 may also compared to the readings of the second flow meter 14 to determine the instantaneous dilution ratio. The central processor 104 can continually monitor the actual dilution ratio of the chemical concentrate being combined in the mixing manifold 12. This actual dilution ratio can then be compared to a predetermined preferred ratio entered into memory. The central processor 104 can then adjust the actual dilution ratio to achieve an optimum ratio by signaling the diluent metering means 10 to open or close.

After the proper dose of chemical concentrate is introduced into the diluent stream as measured by the first and second flow meters 10 and 14, the chemical concentrate valve 23 closes and the diluent metering means 10 opens. The pump means 13 continues pumping diluent for an additional amount of time to provide a diluent post-flush of the chemical concentrates.

The chemical composition flows from the pump 13 to the diverter manifold means 15. Once into the diverter manifold means 15, the chemical composition first passes into a manifold 24. This manifold 24 contains distribution valves 25. The diverted chemical composition passes through the distribution valves 25, and passes by a proof of delivery sensor 16 (such as a sensor of the type manufactured by GEMS under model number designation 159055 RFO-2500P-0.50-PP-CONN) on its way to the utilization point. One example of a utilization point is a washing machine 18.

The distribution valve 25 is then closed and the air push valve 27 is opened. Immediately thereafter, another request can be handled.

FIG. 6 illustrates a preferred physical arrangement of the dilution and dosing system 201.

Alternative Embodiment

Figure 7:
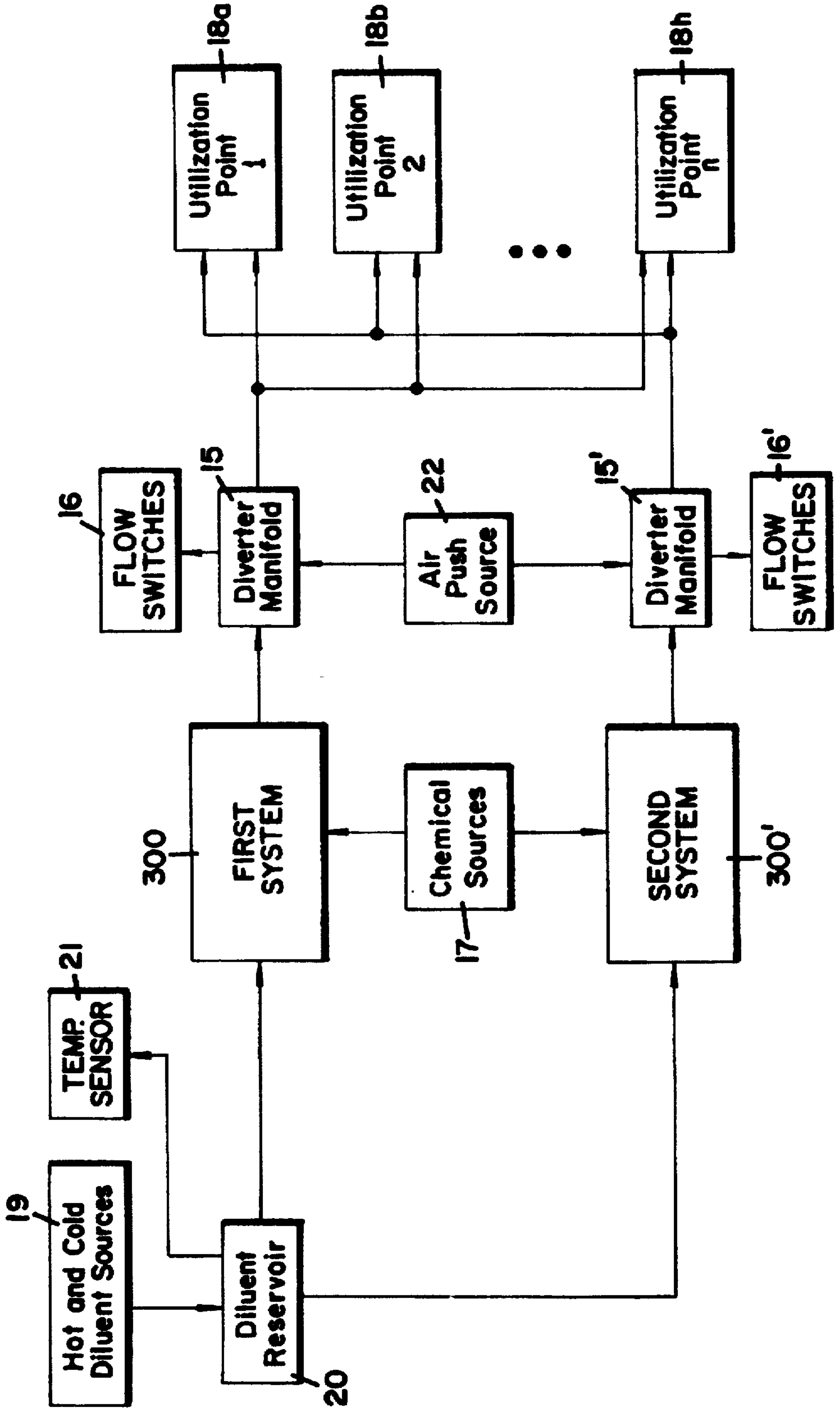
FIG. 7 illustrates a functional block diagram of first 300 and optional second 300' mixing systems used in conjunction with one another.

FIG. 7 illustrates a system in which a second mixing system 300' is used in combination with first mixing system 300. Such an embodiment preferably includes a larger pump so as to deliver those chemicals which require a larger dilution ratio or to deliver the chemicals to utilization points 18 with larger washing zones.

It will be appreciated that such second system 300' may be operated with the same control means 100, draw from the same chemical sources 17, and utilize the same diluent reservoir. In the preferred embodiment, a separate diverter manifold 15' is provided, as well as proof of flow switches 16'.

It should be emphasized that the present invention is not limited to any particular components, materials or configurations, and modifications of the invention will be apparent to those skilled in the art in light of the foregoing description. This description is intended to provide a specific example of an embodiment which clearly discloses the present invention. Accordingly, the invention is not limited to this embodiment or to the use of elements having the specific configurations and shapes as presented herein. All alternative modifications and variations of the present invention which fall within the spirit and broad scope of the appended claims are included.

We claim:

1. An apparatus for preparing a chemical composition by diluting a chemical concentrate with a diluent, the apparatus comprising:

(a) metering means for controlling the output of a diluent from a diluent source;

(b) a source of a chemical concentrate;

(c) a mixing manifold, in fluid communication with the metering means and the source of chemical concentrate, for mixing the diluent with the chemical concentrate to form a chemical composition, and wherein the mixing manifold includes an outlet port;

(d) control means for determining a dilution ratio and generating the control signal for the metering means; and (e) a source of air, operatively connected to the outlet port for pushing the chemical composition to the utilization point, wherein the time required to deliver the chemical composition to the utilization point is reduced.

2. The apparatus of claim 1, further comprising a pump means, in fluid communication with the outlet port, for drawing the diluent and chemical through the mixing manifold.

3. The apparatus of claim 2, further comprising a product diverter means for delivering the chemical composition to the utilization point, the product diverter means being located downstream from the pump means.

4. The apparatus of claim 3, wherein the product diverter means comprises a distribution manifold having at least two distribution valves operable for delivering the chemical composition to multiple utilization points, the distribution manifold is part of the outlet port, and the source of air is operatively connected to the outlet port at the distribution manifold.

5. The apparatus of claim 4, wherein the control means handles requests from the utilization points in predetermined hierarchical fashion based on the request type and status.

6. The apparatus of claim 5, wherein the hierarchy includes:

a) means for determining if a request has already been deferred;

b) means for determining if the request is for a priority product;

c) means for determining if the request is a first in line request; and wherein a priority product may be defined by a user.

7. The apparatus of claim 2, wherein the pump means is a positive displacement pump.

8. The apparatus of claim 1, wherein the diluent metering means comprises a plurality of diluent entry valves having different size metering orifices which are arranged and configured to provide predetermined flow rates and wherein the diluent entry valves are connected in parallel with one another.

9. The apparatus of claim 8, wherein four different diluent entry valves are arranged and configured to produce sixteen distinct flow rates in response to the control signals.

10. The apparatus of claim 1, wherein the diluent metering means comprises a variable flow valve.

11. The apparatus of claim 1, further comprising:

(a) first flow rate measuring means for generating a first signal indicating the flow rate of the diluent;

(b) second flow rate measuring means for generating a second signal indicating the flow rate of the chemical composition from the outlet port; and (c) wherein the control means receives the first and second signals, determines a dilution ratio, and generates control signals to control the dilution of the chemical concentrate, whereby the control signal adjusts the length of time that the chemical valves are open.

12. The apparatus of claim 1, wherein the first flow rate measuring means and the second flow rate measuring means each comprises digital flow meters in electronic communication to the control means.

13. The apparatus of claim 1, further comprising a second mixing system including:

(a) second metering means for controlling the output of a diluent from a diluent source;

(b) a second mixing manifold, in fluid communication with the second metering means and the source of chemical concentrate, for mixing the diluent with the chemical concentrate to form a chemical composition, and wherein the second mixing manifold includes an outlet port; and (c) wherein the second mixing system delivers diluted chemicals to the utilization points independent of and simultaneously with the first mixing system.

14. The apparatus of claim 1, wherein the diluent source comprises:

(a) a diluent reservoir;

(b) a hot diluent source;

(c) hot diluent valve means, operatively connected to the hot diluent source, for controlling the flow rate from the hot diluent source into the diluent reservoir;

(d) a cold diluent source;

(e) cold diluent valve means, operatively connected to the cold diluent source, for controlling the flow rate from the cold diluent source into the diluent reservoir; and (f) a temperature sensor located within the diluent reservoir, for communicating temperature information of the diluent in the diluent reservoir to the control means.

15. The apparatus of claim 14, wherein the hot diluent valve means and the cold diluent valve means are arranged and configured to be selectively actuated by the control means, and wherein the volume and temperature of the diluent in the reservoir are maintained at a predetermined temperature by selective actuation of the hot diluent valve means and cold diluent valve means, by the control means, according to a predetermined range on the basis of information collected by the temperature sensor and a volume sensor.

16. An apparatus for preparing a chemical composition by diluting a chemical concentrate with a tempered diluent, the apparatus comprising:

(a) a tempered diluent source, wherein the a diluent output flow rate from the source is restricted by a metering means, wherein the metering means comprises:

(i) a plurality of diluent metering devices connected in parallel with one another, for varying the tempered diluent output flow from the metering means when the combination of metering devices through which the tempered diluent flows is changed; and (ii) a first digital flow meter for generating a first signal indicating the flow rate of the tempered diluent from the metering means, and (b) at least two sources of a chemical concentrate;

(c) a mixing manifold, for mixing the tempered diluent with the chemical concentrate to form a chemical composition, the mixing manifold having an inlet port in fluid communication with the source of a chemical concentrate, an inlet port for the tempered diluent in fluid communication with the diluent output flow from the metering means, and an outlet port for the chemical composition;

(d) a second digital flow meter for generating a second signal indicating the flow rate of the chemical composition from the outlet port of the mixing manifold;

(e) first computer controllable valve means operatively connected to the diluent metering means, for automatically changing the combination of diluent metering devices through which the diluent is flowing;

(f) second computer controllable valve means operatively connected to each chemical concentrate inlet port, the valve means being operable for sequentially admitting a separate chemical concentrate into the mixing manifold;

(g) a gear pump in fluid communication with the mixing manifold for moving the chemical composition from the mixing manifold to a utilization point; and (h) a controller means for controlling the operation of the first computer controllable valve means, the second computer controllable valve means and the gear pump in accordance with the first and second signals to maintain a predetermined dilution of the chemical concentrate.

17. The apparatus of claim 16, wherein the utilization point is a washing machine.

18. A method of preparing chemical compositions with improved control of dilution precision, comprising the steps of:

(a) pumping a diluent from a diluent supply into a metering system having variable diluent metering means;

(b) generating a first signal indicating the flow rate of the diluent from the metering system into a mixing manifold by means of a first flow meter;

(c) drawing a chemical concentrate from a container into the mixing manifold whereby a chemical composition is formed;

(d) generating a second signal indicating the flow rate of the chemical composition from an outlet port of the mixing manifold by means of a second flow meter;

(e) determining the dilution of the chemical concentrate by comparing the first and second signals and generating an error signal from a predetermined difference and the actual difference between the first and second signals; and (f) pushing the diluted chemical concentrate to a utilization point with air, wherein the accuracy of the desired chemical composition dilution is improved and the delivery time is shortened.

19. The method of claim 18, further comprising the step of utilizing a central processor to control the diluent metering means and pump to achieve a predetermined dilution based on the first and second signals.

20. The method of claim 18, further comprising the step of metering the flow of diluent into the mixing manifold prior to controlling the flow of diluent whereby a vacuum in the mixing manifold is created and the chemical concentrate is automatically drawn into the mixing manifold.

21. An apparatus for preparing a chemical composition by diluting a chemical concentrate with a diluent, the apparatus comprising:

(a) metering means for controlling the output of a diluent from a diluent source, wherein the metering means comprises:

(i) diluent metering means, responsive to a control signal, and (ii) first flow rate measuring means for generating a first signal indicating the flow rate of the diluent;

(b) a source of a chemical concentrate;

(c) a mixing manifold, in fluid communication with the metering means and the source of chemical concentrate, for mixing the diluent with the chemical concentrate to form a chemical composition, and wherein the mixing manifold includes an outlet port;

(d) second flow rate measuring means for generating a second signal indicating the flow rate of the chemical composition from the outlet port; and (e) control means, including a central processor, for receiving the first and second signals, determining a dilution ratio and generating the control signal to control the dilution of the chemical concentrate, whereby the control signal adjusts the diluent flow rate by adjusting the diluent metering means.

22. The apparatus of claim 21, further comprising a pump means in fluid communication with the outlet port for moving chemical composition from the outlet port to a utilization point.

23. The apparatus of claim 22, further comprising a product diverter means for delivering the chemical composition to a utilization point, the product diverter means being located downstream from the pump means and in fluid communication with the second flow rate measuring means.

24. The apparatus of claim 23, wherein the product diverter means comprises a distribution manifold having at least two distribution valves operable for delivering the chemical composition to multiple utilization points.

25. The apparatus of claim 21, wherein the first flow rate measuring means and the second flow rate measuring means each comprises digital flow meters in electronic communication to the central processor.

26. The apparatus of claim 21, wherein the control means is a microprocessor.

27. The apparatus of claim 21, wherein the diluent source comprises:

(a) a diluent reservoir;

(b) a hot diluent source;

(c) hot diluent valve means, operatively connected to the hot diluent source, for controlling the flow rate from the hot diluent source into the diluent reservoir;

(d) a cold diluent source;

(e) cold diluent valve means, operatively connected to the cold diluent source, for controlling the flow rate from the cold diluent source into the diluent reservoir; and (f) a temperature sensor located within the diluent reservoir, for communicating temperature information of the diluent in the diluent reservoir to the control means.

28. The apparatus of claim 27, wherein the hot diluent valve means and the cold diluent valve means are arranged and configured to be selectively actuated by the control means, and wherein the volume and temperature of the diluent in the reservoir are maintained at a predetermined temperature by selective actuation of the hot diluent valve means and cold diluent valve means, by the control means, according to a predetermined range on the basis of information collected by the temperature sensor and a volume sensor.

29. An apparatus for preparing a chemical composition by diluting a chemical concentrate with a tempered diluent, the apparatus comprising:

(a) a tempered diluent source, wherein the a diluent output flow rate from the source is restricted by a metering means, wherein the metering means comprises:

(i) a plurality of diluent metering devices connected in parallel with one another, for varying the tempered diluent output flow from the metering means when the combination of metering devices through which the tempered diluent flows is changed; and (ii) a first digital flow meter for generating a first signal indicating the flow rate of the tempered diluent from the metering means, and (b) at least two sources of a chemical concentrate;

(c) a mixing manifold, for mixing the tempered diluent with the chemical concentrate to form a chemical composition, the mixing manifold having an inlet port in fluid communication with the source of a chemical concentrate, an inlet port for the tempered diluent in fluid communication with the diluent output flow from the metering means, and an outlet port for the chemical composition;

(d) a second digital flow meter for generating a second signal indicating the flow rate of the chemical composition from the outlet port of the mixing manifold;

(e) first computer controllable valve means operatively connected to the diluent metering means, for automatically changing the combination of diluent metering devices through which the diluent is flowing;

(f) second computer controllable valve means operatively connected to each chemical concentrate inlet port, the valve means being operable for sequentially admitting a separate chemical concentrate into the mixing manifold;

(g) a gear pump in fluid communication with the mixing manifold for moving the chemical composition from the mixing manifold to a utilization point;

(h) a source of air selectively connectable downstream of the mixing manifold in response to an air control signal, wherein the chemical concentrate is pushed by the air to a utilization point and the time required for the chemical concentrate to be delivered to the utilization point is decreased; and (i) a controller means for controlling the operation of the first and second computer controllable valves and the gear pump in accordance with the first and second signals to deliver a predetermined amount of the chemical concentrate and to generate an air push signal.

30. The apparatus of claim 29, wherein the utilization point is a washing machine.

31. A method of preparing chemical compositions with improved control of dilution precision, comprising the steps of:

(a) pumping a diluent from a diluent supply into a metering system having variable diluent metering means;

(b) generating a first signal indicating the flow rate of the diluent from the metering system into a mixing manifold by means of a first flow meter;

(c) drawing a chemical concentrate from a container into the mixing manifold whereby a chemical composition is formed;

(d) generating a second signal indicating the flow rate of the chemical composition from an outlet port of the mixing manifold by means of a second flow meter;

(e) determining the dilution of the chemical concentrate by comparing the first and second signals and generating an error signal from a predetermined difference and the actual difference between the first and second signals; and (f) adjusting the flow of diluent into the mixing manifold by varying the diluent metering means in accordance with the error signal, whereby the accuracy of the desired chemical composition dilution is improved.

32. The method of claim 31, further comprising the step of utilizing a central processor to control the diluent metering means and pump to achieve a predetermined dilution based on the first and second signals.

33. The method of claim 31, further comprising the step of metering the flow of diluent into the mixing manifold prior to controlling the flow of diluent whereby a vacuum in the mixing manifold is created and the chemical concentrate is automatically drawn into the mixing manifold.

* * * * *